United States Patent [19]

Kupper

[11] 4,381,826
[45] May 3, 1983

[54] WEIGHING SCALE OF UNITARY CONSTRUCTION

[75] Inventor: Walter E. Kupper, Madison, N.J.

[73] Assignee: Mettler Instrumente AG, Greifensee, Switzerland

[21] Appl. No.: 200,979

[22] Filed: Oct. 27, 1980

[51] Int. Cl.³ .................... G01G 3/14; G01G 21/08
[52] U.S. Cl. .................................... 177/211; 177/256
[58] Field of Search ............................. 177/211, 256

[56] References Cited

U.S. PATENT DOCUMENTS

| | | |
|---|---|---|
| 3,465,838 | 9/1969 | Kienzle et al. |
| 3,707,076 | 12/1972 | Jones. |
| 3,938,603 | 2/1976 | Shoberg et al. |
| 3,949,822 | 4/1976 | English et al. .................. 177/211 X |
| 3,966,003 | 6/1976 | Miller .............................. 177/211 |
| 4,261,429 | 4/1981 | Lockery ........................... 177/211 |
| 4,315,554 | 2/1982 | Williamson ....................... 177/256 |

FOREIGN PATENT DOCUMENTS

2905314 Fed. Rep. of Germany.

Primary Examiner—George H. Miller, Jr.
Attorney, Agent, or Firm—Marianne Rich

[57] ABSTRACT

A single unit made of a light metal or alloy preferably in a diecast process is shaped to constitute the frame, the levers, and hinged bearings of a platform scale. Even the measuring element can be integrated into this one-piece unit. The resultant scale has a very low profile and is particularly suitable for mass manufacture for applications not requiring excessive resolution as, for example, post office scales or scales for home use.

10 Claims, 7 Drawing Figures

WEIGHING SCALE OF UNITARY CONSTRUCTION

Cross reference to related applications and publications:
U.S. Pat. No. 3,465,838;
U.S. Pat. No. 3,707,076;
U.S. Pat. No. 3,938,603.

The present invention relates to weighing scales and, more particularly to platform scales.

BACKGROUND AND PRIOR ART

Platform scales are known which include a supporting frame, at least two levers swingably connected to the frame, a measuring element which is elastically deformable and generates electrical signals corresponding to the deformation, a platform directly or indirectly supported by the levers, and a housing.

Scales of this and similar types are known and are described, for example, in U.S. Pat. Nos. 3,465,838, 3,707,076 or 3,938,603. All of the scales disclosed in these patents have the common disadvantage that the assembly of a considerable number of individual parts is required. In addition, a fairly considerable effort for balancing and adjustment of the scale is required. Generally, therefore, the assembly costs are higher than the costs of the material used.

SUMMARY OF THE INVENTION

It is an object of the present invention to furnish a scale of the above-described type in which the assembly and adjustment labor is considerably reduced.

It is a further object of the present invention to furnish a scale which has a relatively shallow construction, i.e. the height of the finished scale is to be substantially less than that of known units.

It is a further object of the present invention to furnish a scale which is particularly adaptable for mass manufacture at low cost.

In the scales of the present invention, the frame, the levers, and the hinged bearings are constructed as a one-piece building block which is essentially a two-dimensional unit extending in the horizontal plane. In a particularly preferred embodiment, the one-piece building block also includes the measuring element. The mechanical part of the scale then is reduced to three or four elements, namely the frame with integrated levers and measuring apparatus, the load-receiving member, and the (two-part) housing.

It is particularly desirable that the frame have a rectangular shape and the load-receiving member be a rectangular platform which also forms the upper part of the housing. This again reduces the number of components which are required.

Further, in a preferred embodiment, the levers are arranged parallel to one another, the measuring element being connected between the two lever ends in such a way that, when a load is applied to the scale, the measuring element is subjected to torsion.

In another embodiment of the invention, the levers are V-shaped, the legs of the V of one facing the legs of the V of the other and being hingedly connected thereto. The measuring element is connected between the free end of one lever and the end of the other lever which is connected to the frame.

While the first embodiment mentioned above is particularly suitable for scales weighing packaged goods, i.e. for weights of several dozen kilograms, the second scale is particularly appropriate for measuring the weight of people. In both embodiments, the levers are further preferably connected with one another by rigid struts which are hingedly connected thereto. The platform rests on the struts the latter also preferably being part of the one-piece building block constituting the scale.

The required hinge connection between parts are also part of the one-piece construction and not separately supplied elements.

Preferably, a strain gauge bridge circuit is mounted on the measuring element, the resistance elements constituting the bridge circuit being preferably applied to only one surface of the latter. This again simplifies the process of manufacture.

Scales according to the present invention are useful wherever scales of low height are required and the resolution requirements of the measuring result are moderate. Thus, as previously mentioned, they are particularly useful for weighing scales for home use. However, they are also suitable for a number of industrial applications.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENTS

Building block 10, which is a one-piece unit, consists of a rigid frame 12 which, at its four corners, has holes 14 which allow feet and the lower housing plate to be screwed on.

Figure 2:
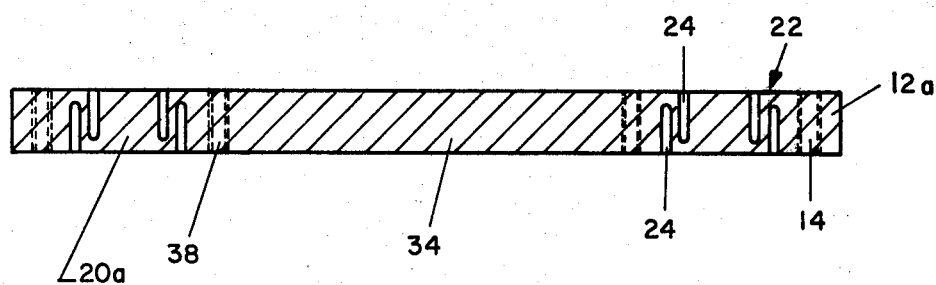
FIG. 2 is a sectional view along line 2—2 in FIG. 1.
Figure 3:
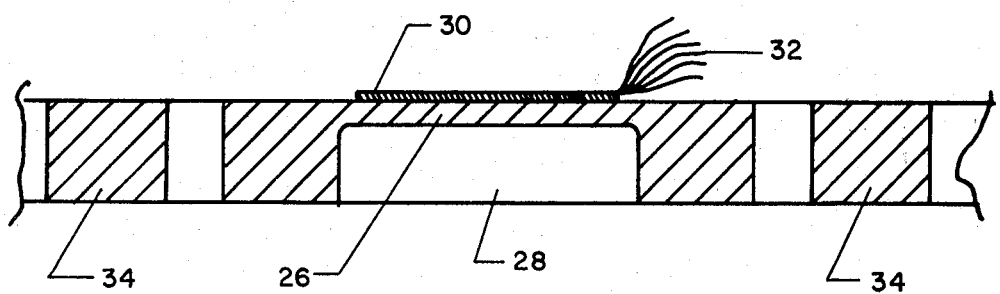
FIG. 3 is a slightly enlarged sectional view along line 3—3 in FIG. 1.

Two rigid levers 16a, 16b are hingedly connected opposite one another to the narrow sides 12a of the frame. Each of the levers forms an asymmetrical T whose stems 18a and 18b face each other, but are offset relative to one another. Crossbars 20a and 20b of T-levers 16a and 16b respectively occupy almost the whole available length of sides 12a of the frame. The ends of crossbars 20a and 20b are each connected to the frame by hinged bearings 22. Each of the latter is formed by a first and second slot spaced closely from one another and extending, respectively, from the top and bottom of the frame. These are illustrated in FIG. 2. The free ends of stems 18a and 18b are rigidly connected to one another by a connecting bar 26. The latter constitutes the measuring element. As illustrated in FIG. 3, bar 26 has a substantially rectangular recess 28; a strain gauge resistance bridge 30 is arranged on the top side of bar 26 in the region of recess 28. Connecting wires 32 connect the bridge to a conventionally constructed measuring and indicating circuit (not shown) which may be arranged internally to or externally to the scale. The strain gauge resistors can be applied in a number of different ways. They can be pasted on in the form of finished elements, i.e. strain gauge strips, or may be applied in a thin film technique including, but not limited to the sputter technique. The two crossbars 20a and 20b of T-levers 16a and 16b are connected to each other by two parallel rigid struts 34. The connections are again made by hinged bearings, 22', formed by staggered slots 24. Perforations 36 allow the connections to have the required flexibility. Four bores 38, which may or may not be threaded, are provided for receiving pins, bolts or other members which carry the platform of the scale (not illustrated). The rectangular platform, which has dimensions corresponding to those of frame 12, then also constitutes the upper part of the housing.

The connections 22 and 22' which respectively connect sides 12a to crossbars 20a and 20b, and crossbars 20a and 20b to struts 34 form a parallel construction: during weighing, struts 34 are lowered by a small amount relative to frame 12 and in a direction parallel thereto. The actual distance varies as a function of load. In turn, a load proportional horizontal swing of T-levers 16a and 16b results, which in turn leads to a load proportional torsion in measuring element 26. The load proportional torsion occurs almost exclusively in the region of recess 28, that is at the location of the strain gauge bridge.

The unbalance of the bridge is measured and a weight indicating signal corresponding thereto is created. The electrical circuits required for this purpose are well known and do not form a part of the present invention. No further discussion of these circuits is therefore required.

Figure 1:
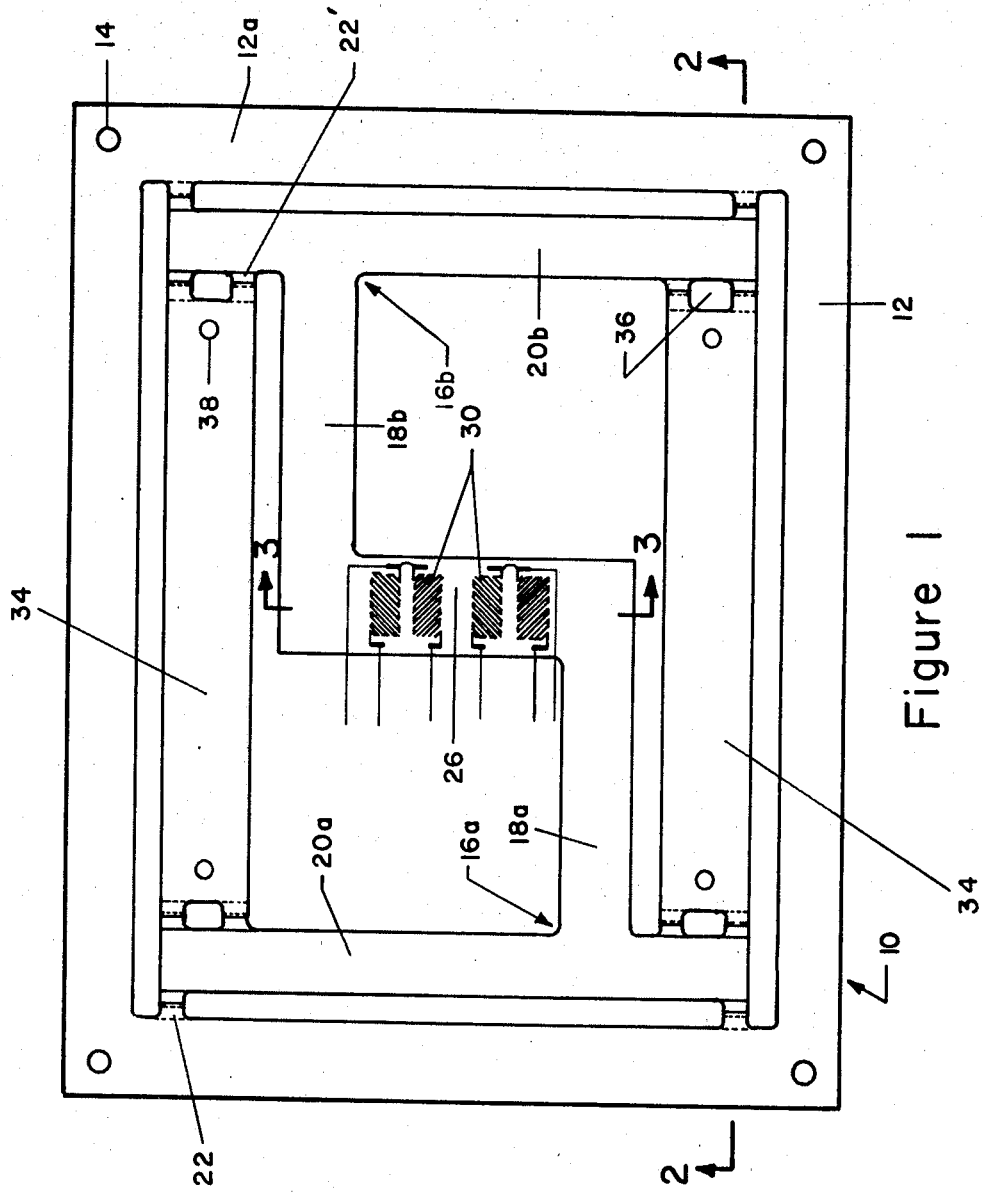
FIG. 1 is a top view of a first embodiment of the one-piece unit of the scale.

It should again be noted that the building block illustrated in FIG. 1 is a single piece of metal and that the various levers, struts, bearings, etc. are formed by removing material from this metal. The thickness of the unit is the same throughout except for the locations of recess 28, slots 24 and of course the various holes. This thickness is in the order of 10 millimeters. The metal is preferably an aluminum alloy, even though other materials may be used and the unit is preferably manufactured by a die-casting process.

A second embodiment of the present invention will now be discussed with reference to FIGS. 4-7. The basic principle of this embodiment is the same as that of the first embodiment, namely the embodiment illustrated in FIGS. 1-3. The main differences are in the arrangement of the levers and in the measuring element.

Figure 4:
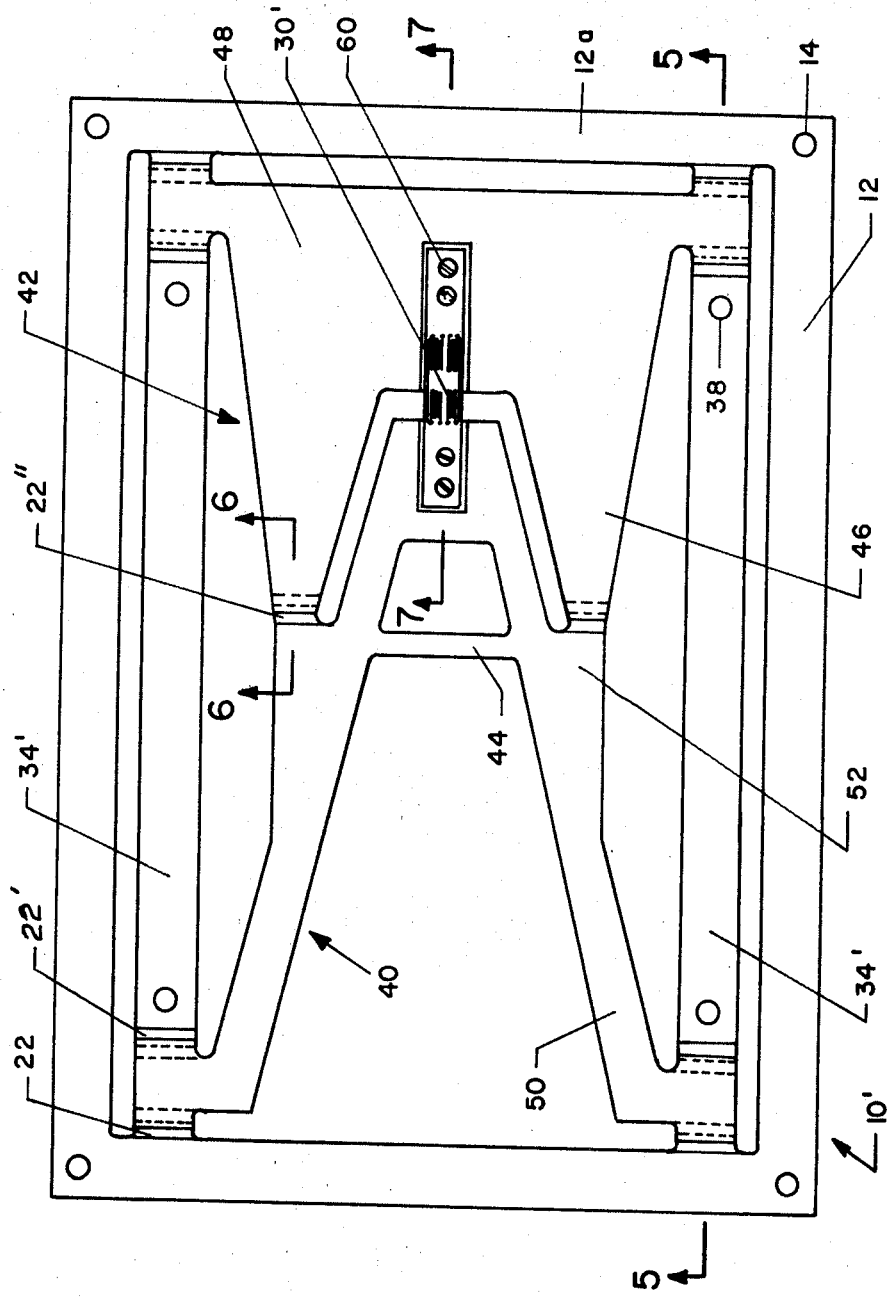
FIG. 4 is a top view of a second embodiment of the one-piece unit of the scale.
Figure 5:
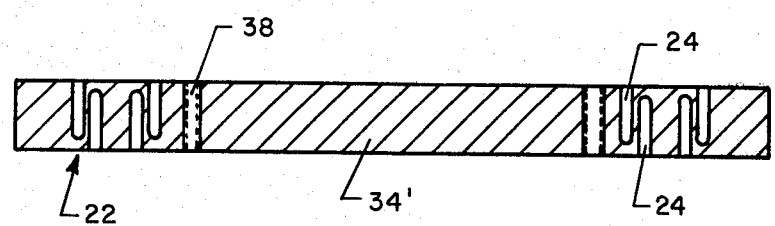
FIG. 5 is a sectional view along line 5—5 of FIG. 4.
Figure 6:
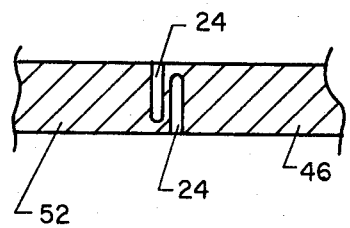
FIG. 6 is a sectional view along line 6—6 of FIG. 4.
Figure 7:
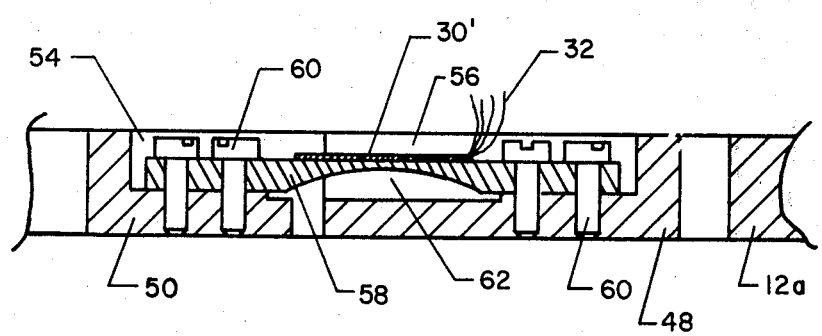
FIG. 7 is a sectional view through the measuring element along line 7—7 in FIG. 4, shown in an enlarged scale.

Referring now to FIG. 4, the single piece constituting building block 10' again consists of a rigid rectangular frame 12 having holes 14 at each corner for fastening of the upper housing plate and of the feet of the scale. Again, hinged bearings 22 formed by pairs of slots 24 are provided at the narrow sides 12a of the frame so that levers 40 and 42 may be fastened to the frame. In this particular case, the two levers do not have the same shape. Lever 40 has the form of an open V, reinforced by a rib 44. Lever 42 which has legs 46 also inclined to a V shape also has a broad base 48. Each of the legs 50 of V-shaped lever 40 has a projection 52 to each of which the free end of one of the legs 46 of V-shaped lever 42 is connected by a hinged bearing 22". The hinged bearing is of course again formed by slots in the base metal. Bearings 22" are located at the center line of block 10'. The closed end of lever 40 has a recess 54, as illustrated in FIG. 7. A recess 56 in base 48 of lever 42 is aligned with recess 54. The bottoms of recesses 54 and 56 are at the same height and together constitute a supporting surface for receiving a measuring element 58. The latter, in this embodiment, is an independent building element and is fastened to levers 40 and 42 with screws 60. Measuring element 58 has an arc-shaped recess on its bottom surface, opposite which, on the upper surface of the measuring element, a strain gauge bridge 30' is positioned. Again, the strain gauge bridge may have been applied by an evaporation process. The changes in resistance of the various elements in the bridge are transmitted to the measuring and evaluating circuits through electrical connections 32.

As was the case in the previously described embodiment, the two levers are connected by a pair of struts 34' which are fastened thereto by hinged bearings 22'. Again, bores 38 are provided which, through bolts or similar elements, support the weighing platform.

The above-described equipment operates as follows: the parallel lowering of struts 34' under load again leads to a slight horizontal swing of levers 40, 42 relative to one another. This horizontal swing, in contradistinction to the first-described embodiment, results in a bending stress in measuring element 58, thereby causing the generation of the measuring signal.

Again it should be noted that all items shown in FIGS. 4-7, with the exception of measuring element 58 are constituted by a single piece of material which has been manufactured to create the various operating elements.

While the invention has been illustrated in preferred embodiments, it is not to be limited to the circuits and structures shown. Since many variations thereof will be evident to one skilled in the art and are intended to be encompassed in the present invention as set forth in the following claims.

I claim:

1. In a weighing scale having load-receiving means and an elastically deformable measuring element, the improvement comprising
   mechanical means intercoupled between said load-receiving means and said measuring element to create load-dependent deformations in said measuring element, said mechanical means comprising a frame, a first and second lever, and means for swingably connecting said first and second levers to said frame;
   wherein each of said levers is T-shaped, each of said T's having a stem and a crossbar;
   wherein said stem of said first T is arranged parallel to said stem of said second T and at a predetermined distance therefrom; and
   wherein said measuring element is connected between said stems so that a load-dependent torsion is applied thereto.

2. A weighing scale as set forth in claim 1, wherein said frame is rectangular; and
   wherein said load-receiving means is a rectangular platform.

3. A weighing scale as set forth in claim 2, further comprising a housing having a lower part; and
   wherein said platform constitutes the upper part of said housing.

4. A weighing scale as set forth in claim 1, wherein said frame and said first and second lever are manufactured as a single unit.

5. A weighing scale is set forth in claim 4, wherein said single unit further comprises said measuring unit.

6. A weighing scale as set forth in claim 4, wherein said measuring element connected between said stems is an integral part of said single unit.

7. A weighing scale as set forth in claim 1, further comprising strain gauge transducers applied to said measuring element.

8. A weighing scale as set forth in claim 7, wherein said strain gauge transducers are applied to said measuring element by a thin film technique.

9. A weighing scale as set forth in claim 8, wherein said measuring element has a surface undergoing maximum deformation under application of a load to said scale; and
   wherein all of said strain gauge transducers are vapor deposited onto said surface.

10. In a weighing scale having load-receiving means and an elastically deformable measuring element, the improvement comprising
    mechanical means intercoupled between said load-receiving means and said measuring element to create load-dependent deformations in said measuring element, said mechanical means comprising a frame, a first and second lever, and means for swingably connecting said first and second levers to said frame:
    wherein said levers are V-shaped, each of said V's having a base and a first and second leg:
    wherein said V-shaped first and second levers extend in the same direction;
    wherein said mechanical means further comprises means for swingably connecting a first part of said first V-shaped lever and a second part of said second V-shaped lever to said frame; and
    wherein said measuring element is connected between the free end of said first lever and the frame connected end of said second lever.

* * * * *